Jan. 4, 1955 E. H. PEDROIA 2,698,710
CONTROL DEVICE FOR PNEUMATIC PRESSURE TANKS
Filed April 28, 1952 2 Sheets-Sheet 1
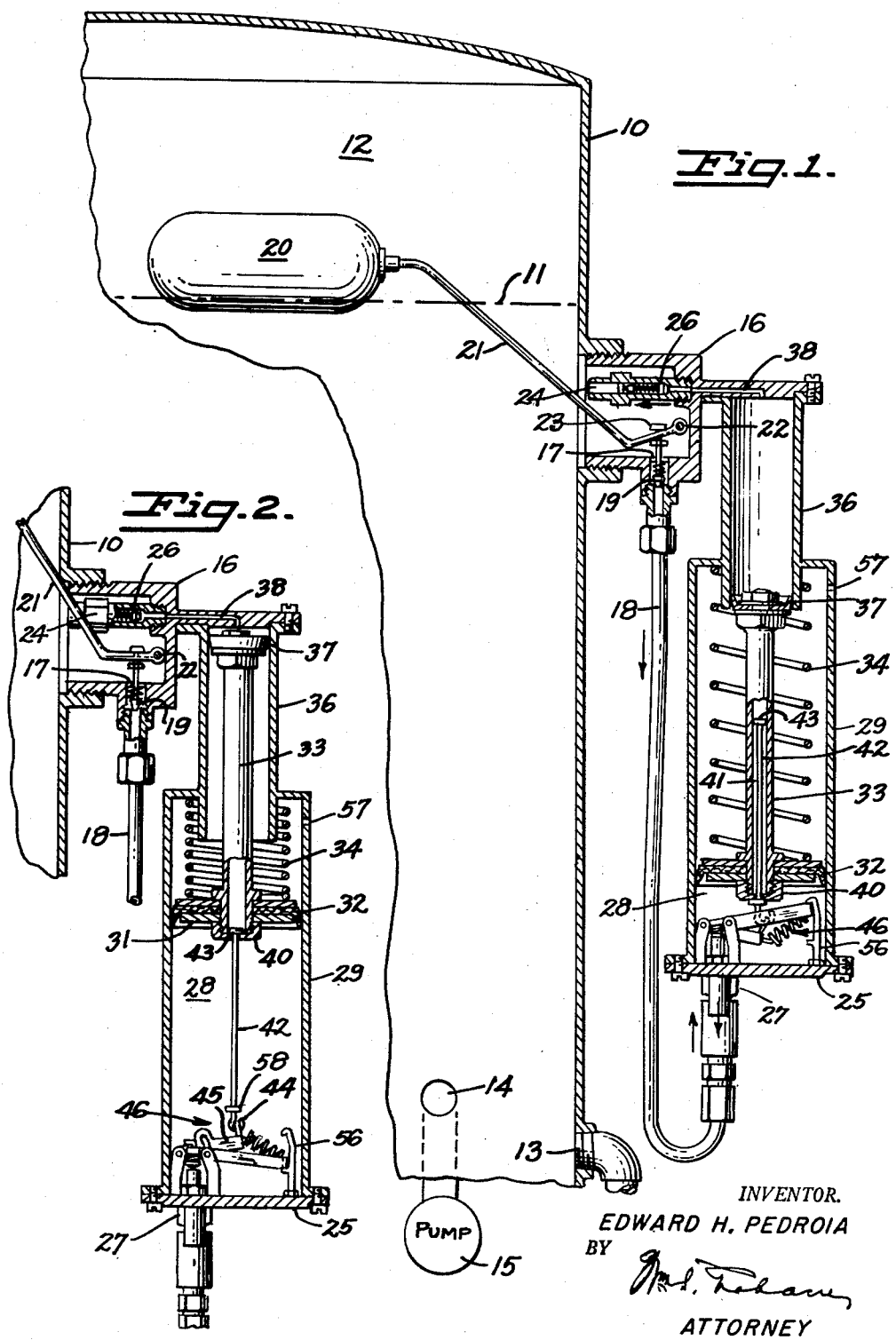
INVENTOR.
EDWARD H. PEDROIA
BY
ATTORNEY Jan. 4, 1955  E. H. PEDROIA  2,698,710
CONTROL DEVICE FOR PNEUMATIC PRESSURE TANKS
Filed April 28, 1952  2 Sheets-Sheet 2
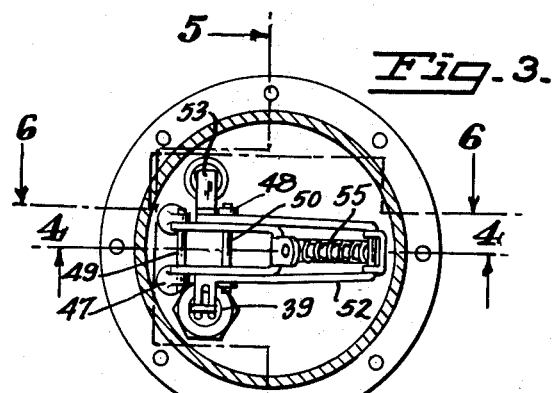
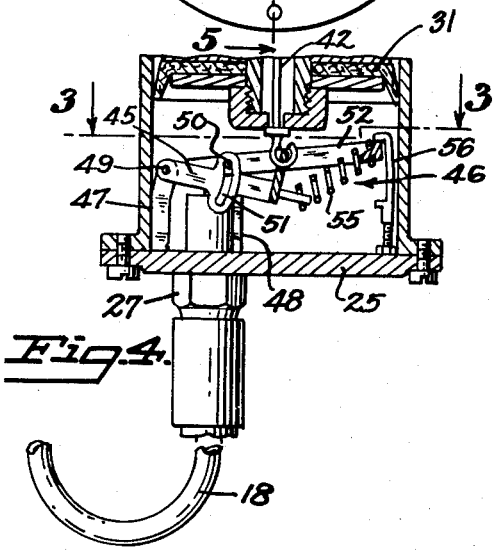
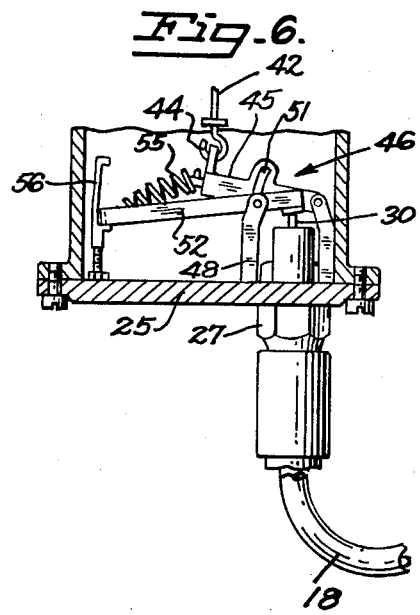
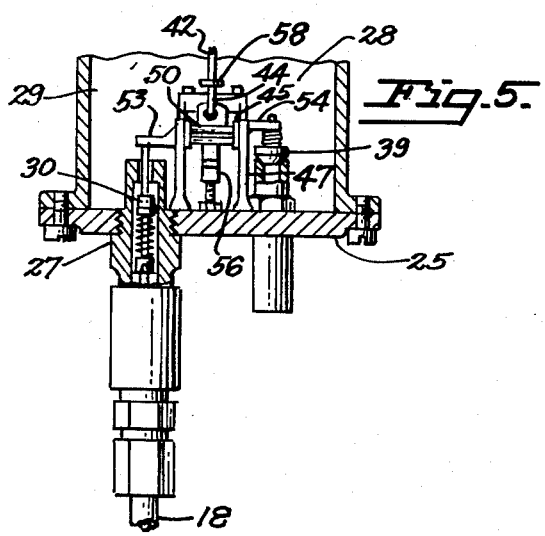
INVENTOR.
EDWARD H. PEDROIA
BY
ATTORNEY

United States Patent Office 2,698,710
Patented Jan. 4, 1955

2,698,710

CONTROL DEVICE FOR PNEUMATIC PRESSURE TANKS

Edward H. Pedroia, Monte Rio, Calif.

Application April 28, 1952, Serial No. 284,842

17 Claims. (Cl. 230—52)

This invention relates broadly to control devices for gaseous fluids in pneumatic pressure tanks for automatically maintaining a suitable volume of a gaseous fluid overlying a liquid in a pressure tank and exerting a pressure on the liquid. The invention has particular application to control of a body of a gaseous fluid such as a body of air at the head of a water tank, to which use the specification herein is directed as an exemplification of one advantageous environment for employment of the invention.

In such pressure tanks it is highly desirable that the pump or other means to supply water to the tank shall not operate immediately to supply an additional volume of water to the tank every time a quantity of water is withdrawn from the tank; otherwise, such means for supplying water would be in operation at such frequent intervals it would needlessly consume power and would become worn by unduly frequent operation. For this reason the means to replenish the water to the tank is regulated and controlled to operate at a differential of pressure in the tank. For example, if the predetermined pressure in the tank is 40 pounds, the control means for replenishing the liquid supply may be set to operate when the pressure in the tank falls to 30 pounds and may continue to operate until the pressure is 50 pounds, providing a differential of 10 pounds above and below the pre-determined optimum of 40 pounds. Such controls for pumps are well known in the art and have relation to the present invention only as their operation relates to the maintenance of a water level in the tank to provide space in the head of the tank for a volume of air which exerts pressure on the liquid to force the water or liquid through distributing conduits at predetermined pressure.

In such pneumatic pressure tank systems, as water is pumped into the tank the air space in the tank is gradually reduced until the air therein is compressed to a predetermined point or water level at which the air exerts a constant pressure on the water within the tank whereby, when a discharge valve is open, the water is forced from the tank into a distributing outlet conduit.

In such tank systems of water supply, a uniform supply of water under a substantially constant pressure for proper operation of the distributing system would theoretically be maintained if a uniform and constant volume of air could be retained in the tank. However, as water is drawn from the tank, the air in the tank expands in volume, thereby reducing its pressure, and also some of the air escapes with the water, and unless the air is replaced, the pneumatic pressure of air is gradually reduced by expansion, which would result in maintenance of a constant predetermined pressure for a comparatively brief period of time, whereupon the tank would, by gradual depletion of the air supply, become completely filled with liquid. Being neither substantially expandable nor compressible, the liquid would, firstly, fail to absorb the shock of hydraulic hammer, and secondly, it would eliminate the differential of pressure, whereupon the pump or other source of water supply to the tank would operate each time any water volume were withdrawn from the tank, causing unnecessary frequent operation and also reducing the tank pressure.

Various expedients and devices have been heretofore employed for maintaining the predetermined air volume and pressure in such tanks, including air injectors in the water supply line, and manually or mechanically operated pumps supplying air to the air chamber in the tank. These devices have had the disadvantages of manual operation, intricacy of mechanical construction, operation or installation, lack of universality of adaptation to various types of pneumatic pressure tanks and like causes.

It is therefore an object of this invention to provide an air control means simple in construction and efficient in operation for maintaining a substantially uniform volume of air in pneumatic pressure liquid tanks; to provide such a control device as a unitary assembly for universal adaptation in such tanks, and which is automatically operative responsive to the pressure in the tank as governed by the water level in the tank.

Broadly, the invention may be described as comprising a hollowed plug for tapping into the wall of a pneumatic pressure liquid tank adjacent to a pre-determined desired water level, the plug communicating with the interior of the tank and being a means for mounting the apparatus on the tank as a unitary assembly. A tube having one end communicating through said plug with the liquid in the tank has a one-way valve adjacent to the plug, the valve being normally urged to an upstream closed position but being open to a downstream flow by a float at water level in the tank. The tube communicates with one end of a hydraulic pressure cylinder through a one-way inlet valve normally open to flow downstream in direction of the hydraulic pressure cylinder, the latter cylinder also having a discharge valve. Means exemplified herein as a snap action mechanism is adapted to simultaneously cut off flow into the hydraulic pressure cylinder and open the discharge valve, and vice versa, responsive to respective pressure and reverse strokes of a hydraulic piston in the cylinder. The opposite end of the hydraulic cylinder has a coaxially aligned air pressure cylinder of relatively smaller diameter the piston of which is integral with and reciprocated by the excursions of the hydraulic piston, for injecting air into the liquid tank.

One form in which the invention may be embodied is described herein and illustrated in the accompanying drawings, it being understood that changes in form, shape, size, degree and minor details may be resorted to without departing from the inventive concept which is defined in the appended claims.

In the drawings:

Fig. 1 is a central elevational section of the invention, a hydraulic piston member being shown in a lower position.

Fig. 2 is a central elevational section of the invention, a hydraulic piston member being shown at an elevated position.

Fig. 3 is a horizontal transverse section on line 3—3 of Fig. 4.

Fig. 4 is a vertical transverse section on line 4—4 of Fig. 3.

Fig. 5 is a vertical transverse section on line 5—5 of Fig. 3.

Fig. 6 is a vertical transverse section on line 6—6 of Fig. 3.

Referring to the drawings in which like reference characters indicate corresponding parts in the several views, 10 is a pneumatic pressure tank for liquid for which it has been predetermined that water at a given level 11 will compress a body of air thereabove in an air pressure chamber 12 sufficiently to exert a constant pressure on the water to discharge the same into a suitable distributing system through an outlet 13, a suitable water inlet 14 and pump 15 or other water pressure source being presumed.

Tightly threaded into the side wall of the tank, preferably adjacently below the predetermined water level, is a hollowed plug 16, the hollow recess of which communicates at one end with the interior of the tank and the water therein. Through its wall the hollow plug has an opening 17 which communicates with a suitably connected water pressure tube 18 through a one-way check valve 19 normally closed against outflow or downstream pressure from the tank but automatically opened responsive to the rise of a float member 20 which obviously is elevated when water in the tank rises due to reduced volume and pressure of air in the chamber 12. The float 20 is connected by float rod 21 to a pivotal mounting 22 within the hollow plug 16, the float rod engaging a pin 23 to open valve 19 to the downstream flow, (as shown by arrow), when the water level and the float 20 rise.

Also communicating with the interior of the tank is an air injector 24 controlled by one-way valve 26 preferably mounted within the hollow plug 16 and communicating at its opposite ends with an air pressure cylinder to be further described.

The liquid pressure tube 18 is connected as at 27 in communication with a pressure chamber 28 of a hydraulic cylinder 29, the flow into the pressure chamber through the tube 18 being responsive to tank pressure through a one-way inlet valve 30 in a head plate 25 of the hydraulic pressure chamber 28. It is to be noted that the head plate 25 also has mounted thereon a discharge or outlet valve 39 and a snap-action mechanism 46, the operation of which will be further described.

Within the hydraulic cylinder 29 is a suitable reciprocal piston generally indicated 31 having a head 32 preferably of the cup leather or washer type mounted at one end of a tubular piston rod 33, the piston being spring loaded by coil spring 34 towards the hydraulic pressure chamber 28, the spring 34 having less tension value than the hydraulic pressure from tank 10.

The opposite end of the hydraulic cylinder opens into a coaxial air compressor cylinder 36 having air piston 37 reciprocal therein, the air piston being secured to and closing the opposite end of the piston rod 33, whereby the pistons are connected in spaced relation for unison reciprocation. The air piston is preferably of the cup leather type, the cup leathers of pistons 31 and 37 being cupped oppositely. The pistons are operatively opposite in the sense that the pressure stroke of the hydraulic piston is the suction stroke of the air piston, and vice versa.

It is to be observed that the air cylinder is of smaller diameter than the hydraulic cylinder, a ratio of substantially two to one of diameter having been found practical and efficient by way of example, but without limitation to such ratio.

At its closed end the air cylinder is provided with an outlet vent or passage way 38 in the head of the air cylinder, said vent communicating with the interior of the liquid tank through the one way check valve 26 of air injector 24, through the hollow plug 16. Manifestly the check valve 26 is closed against the pressure in the liquid tank and opens to permit flow of air into the tank from the air cylinder.

Novel means are provided for opening and closing the respective inlet and discharge valves 30, 39, responsive to the reciprocation of the hydraulic pressure piston. As previously noted, the piston rod 33 is tubular as at 41; at its end adjacent the hydraulic piston head the tube is closed by a cap nut 40 having a central orifice therethrough. Mounted for reciprocation within the tube 41 of the piston rod and guided through the orifice of the cap 40 is a freely slidable and extendable operating slide rod 42 having a head 43 for maintaining the enclosed end in the tube, said rod having its free end connected, as by hook 44, to a snap lever arm 45 of a snap action mechanism generally indicated 46 which is the proximate means for operating the inlet and discharge valves 30, 39.

The snap action mechanism 46 is mounted within the hydraulic pressure chamber on the head plate 25 suitably adjacent to the respective inlet and discharge valves 30, 39, as best shown in Figs. 3 to 6. This snap action mechanism comprises a pair of relatively spaced snap-lever or trigger standards 47 and a pair of relatively spaced valve yoke fulcrum standards 48, the standards being between the valves 30 and 39 and conveniently offset on opposite sides of the alignment of said valves. Pivotal bearing pin 49 spans between the upper ends of the snap-lever standards 47 and fulcrum pin 50 connects the upper end of the valve yoke standards. On the pin 49, there is pivotally mounted one end of the snap lever arm 45, at the opposite free end of which the hook 44 of extendable operating rod 42 is connected, the snap lever arm intermediate its ends having an elongated closed guide slot 51 through which the pin 50 extends loosely and slidably, the pin 50 serving as a stop member to delimit movement of the snap lever arm in either direction in a vertical plane. A substantially U-shaped valve yoke 52 having substantially parallelly retroverted arms is pivotally mounted intermediate the ends of its arms on the pin 50 which thereby serves as a fulcrum for the free ends of the yoke arms which are extended therebeyond and flanged at the free end of the extension substantially perpendicularly outwardly to provide wings 53 and 54 which operate the valves 30 and 39, as will be described.

Between the free end of the snap lever arm 45 and the loop or bend of the retroverted U-shaped valve yoke 52 there is a coil spring member 55 mounted under compression whereby when the snap-lever arm 45 is stopped at a downward position by pin 50, as shown in Figs. 1 and 4 the tension of the spring 55 is upwardly against the loop end of the valve yoke 52, whereas when the free end of the snap-lever arm 45 is moved past a neutral dead center of spring tension to the upper position as shown in Figs. 2 and 6 the tension of spring 55 is downwardly, thus swinging the free end of the yoke lever 52 successively upwardly and downwardly within the limits of its orbit as limited in opposite directions by stop member 56.

Upon swinging of the yoke arm 52 the extended flange 53 of the yoke arm operates the inlet valve 30, whereas the flange 54 operates the discharge valve 39. Since the flanges operate upwardly and downwardly in unison responsive to movement of the yoke arm, it is manifest that to operate the inlet and discharge valves simultaneously, said valves must be operatively opposites. In the present embodiment the inlet valve 30 opens and the discharge valve 39 is closed when the valve yoke arm 52 is resiliently sprung to upward position by the lever arm 45 and spring 55, since this represents the downward position of piston 31 as shown in Figs. 1 and 5 wherein lever arm 45 has been urged to a downward position. Conversely, the discharge valve is opened and the inlet valve is closed when the valve yoke arm is sprung to a downward position, since this represents the upward position of piston 31 as shown in Figs. 2 and 6 wherein the operating rod 42 has raised the lever arm 45 and thus tensioned the yoke arm downwardly.

Any suitable type of one-way valve may be employed for each or any of the valves described herein, and in smaller sized units the well known pneumatic tire valve, commonly known in the trade as the Schrader type, has been found effective and efficient, though in the present exemplification the discharge valve 39 has been illustrated as a simple lift valve of a modified poppet type.

In operation, when the tank needs air, it will be because the predetermined air volume and pressure are reduced, whereupon the water in the tank will rise above its predetermined level responsive to the pressure of its source of supply. When it rises above its predetermined level the float 20, acting through float rod 21, will open valve 19, thereby allowing water to flow through the tube 18 and through inlet valve 30 responsive to hydraulic pressure in the tank, the inlet valve 30 being open because hydraulic piston 31 at that stage of operation will be at downward position responsive to amplitude and tension of spring 34. Water entering hydraulic chamber 28 forces the hydraulic piston upwardly against tension of spring 34, air on the opposite side of the hydraulic piston being exhausted through an air vent 57, which also provides atmospheric pressure in the air cylinder 36 due to vacuum suction in the air cylinder on its down or suction stroke and the reversely cupped washer of air piston 37. When the hydraulic piston is raised it imparts a compression stroke to the air piston 37 superinduced by the differential of area ratio of pressure of the hydraulic piston to the air piston. The air in the air cylinder is thus pumped into the pressure tank through passageway 38 and valve 26 of injector 24.

The raising of the hydraulic piston and its tubular rod 33 compresses the spring 34 which has less tension value than the hydraulic pressure in the hydraulic compression chamber from the tank, and simultaneously the operating rod 42, which being freely slidable, is progressively extended until its head 43 engages the cap 40 whereupon the operating rod 42 raises the snap-lever arm 45 through its central neutral position, causing the spring 55 of the snap action mechanism to force the valve yoke 52 to a downward position responsive to tension of spring 55, such movement being delimited by stop member 56. Since the valve yoke is pivotally fulcrumed intermediate its ends on the pin 50, this action raises the opposite free flanged ends 53, 54 and thus cuts off hydraulic tank pressure by closing the inlet valve 30 and opening the discharge lift valve 39, allowing the liquid in hydraulic chamber 28 to exhaust and waste responsive to compression of spring 34 against the hydraulic piston, which returns the hydraulic piston and air piston to starting position. When the piston assembly is thus actuated to the lower or starting position the cap 40 engages and depresses the disc member 58 and through connection 44 depresses the lever arm 45 through its central or neutral position, whereupon the snap action mechanism raises the valve yoke arm at its spring-engaged end and thus depresses the flanges 53, 54 at the opposite extended end. Since depressing the flanges correspondingly operates to open inlet valve 30, and close outlet discharge valve 39, the pressure chamber is then open for a repeat operation, in the event the valve 19 is raised by float 20. The downward spring actuated movement of the hydraulic piston obviously causes a suction stroke to air cylinder 36, but since the injector valve 26 is closed against intake from the tank an additional supply of air at atmospheric pressure enters the air cylinder around its reversely cupped packing, responsive to such reverse or suction stroke.

If, after one such cycle of operation, the air in the tank is insufficient to lower the water to the predetermined level, the float will maintain valve 19 open and the operation will be automatically repeated as soon as the return of the hydraulic cylinder reopens the valve 30, thus restarting the cycle of operation repeatedly until air volume and pressure in the tank force the water in the tank to the predetermined level at which the float closes valve 19.

It is to be noted that this entire control apparatus is a unitary structure requiring for installation a single tapping and connection to the tank body which, as here exemplified, is hollow plug 16.

Having described the invention, what is claimed as new and patentable is:

1. A control apparatus for supplying air to liquid tanks, comprising a float member for mounting within the tank adjacent to a predetermined liquid level, a water tube outlet member having communication with the interior of the tank below the predetermined liquid level, a valve operable by said float for controlling the outlet flow of water from the tank, a hydraulic pressure means including a pressure chamber having communication with said tube and having an inlet valve and a discharge valve, a hydraulic piston reciprocable in said chamber the inlet valve and the discharge valve being operable simultaneously for opening one and closing the other responsive to the reciprocation of the hydraulic piston, and an air pressure means operable responsive to reciprocation of said hydraulic piston and communicating with said tank and adapted for injecting air into the tank.

2. A device of the character described having the elements of claim 1 and in which there is a spring means loading the hydraulic piston toward the hydraulic pressure chamber, and the inflow valve and the discharge valve therein.

3. An assembly unit for controlling air volume in pneumatic pressure liquid tanks having the elements of claim 1, and which includes a hollow plug member for connecting the assembly as a unit in communication with the interior of the tank, and in which the float member operates within the tank through said hollow plug.

4. In an air control device for liquid tanks having the elements of claim 1, and in which the hydraulic pressure means includes a snap action mechanism operatively responsive to the hydraulic pressure means for simultaneously opening and closing of the respective inflow and outflow valves for relatively opposite flow.

5. Means for controlling air volume in pneumatic pressure liquid tanks having an outlet adjacent a predetermined water level, said means comprising a float member for mounting within the tank adjacent to the predetermined liquid level, a one-way valve operable by flow of water therethrough said float for controlling said outlet, a hydraulic cylinder having a piston reciprocable therein providing a hydraulic pressure chamber which communicates with said outlet, an air pressure means operable responsive to reciprocation of said hydraulic piston and communicating with said liquid tank for injecting air into the tank, a conduit whereby the pressure chamber communicates with liquid in the tank, a discharge valve from the hydraulic pressure chamber, and means operatively responsive to the reciprocation of the hydraulic piston for simultaneously opening and closing the discharge valve of said pressure chamber for relatively opposite flow therethrough.

6. A device of the character described having the elements of claim 5, and in which there is a spring means loading the hydraulic piston towards the pressure chamber of the cylinder and said inflow and discharge valves.

7. A device of the character described having the elements of claim 5, and in which the means for operating the discharge valve includes a snap action mechanism, and in which there is a valve operating rod having one end slidable in the hydraulic piston and having its opposite end operatively contacting the snap action mechanism whereby the snap action mechanism is operated responsive to reciprocation of the hydraulic piston.

8. A device of the character described having the elements of claim 5, and in which the means for operating the valve mechanism in the hydraulic pressure chamber includes a snap-action mechanism, and said hydraulic piston includes a tubular piston rod having one end portion of an operating rod freely slidable therein, the slidable operating rod providing a connection operative between the hydraulic piston and the snap action means for opening and closing the discharge valve in the hydraulic pressure chamber.

9. A device of the character described having the elements of claim 5, and in which the air pressure means comprises an air pressure cylinder having a piston therein reciprocable by the hydraulic piston, said air piston being of lesser diameter than the hydraulic piston.

10. An air control device for liquid tanks having the elements of claim 5, and in which the air pressure means comprises an air pressure cylinder communicating coaxially with the hydraulic cylinder and being of lesser diameter than the hydraulic cylinder, said air pressure cylinder having a one-way valve-controlled vent communicating with the liquid tank.

11. An assembly unit for controlling air volume in pneumatic pressure liquid tanks including a hollow plug member for connecting the unit in communication with the interior of the tank, a float member for mounting within the tank, a valve controlled outlet member for communicating with the interior of the tank below the predetermined liquid level, the valve thereof being operable by the float through said hollow plug member, a hydraulic cylinder having a piston reciprocable therein providing a hydraulic pressure chamber, an air pressure means operable responsive to said hydraulic pressure means and communicating with said liquid tank and adapted for injecting air into the tank, an inflow valve whereby the pressure chamber communicates with liquid in the tank, a discharge valve from the pressure chamber, means for operating said valves responsive to the reciprocation of the hydraulic piston for simultaneously opening and closing in the respective inflow and discharge valves of the hydraulic pressure chamber for relatively opposite flow therethrough.

12. A device of the character described having the elements of claim 11, and in which there is spring means loading the piston towards the pressure chamber and said inlet and discharge valves.

13. An air control device for liquid tanks having the elements of claim 11, and in which the means for operating the inflow and discharge valves include a snap-action mechanism, and there is a connecting means between the hydraulic piston and the snap-action means.

14. A device of the character described having the elements of claim 11, and in which the valve operating means includes a snap-action mechanism which includes a lever arm member pivoted at one end and having its opposite end connected to an operating rod slidably connected to the hydraulic piston, a valve yoke pivotally fulcrumed intermediate its ends and having one end spring-tensioned with relation to the adjacent free end of said lever arm whereby, when the free end of said lever arm is moved by the slidable operating rod of the hydraulic piston to either side of a dead center neutral plane, the free end of the valve yoke is resiliently impelled by the spring to the opposite side of said dead center, said inlet and outlet valves being respectively opened and closed simultaneously responsive to the snap-action mechanism.

15. A control apparatus for supplying air to an air chamber over a predetermined level of water in a water supply tank, comprising a hydraulic cylinder and an air cylinder, the hydraulic cylinder having a greater diameter than the air cylinder, each cylinder having a piston reciprocable therein providing a pressure chamber in each cylinder and an intermediate area therebetween which is open to admit air thereinto, the said pistons being connected in spaced relation for unison reciprocation, the hydraulic pressure chamber having a discharge outlet and a one-way valve therein for discharge of water therefrom, and said air pressure chamber having a valve controlled air vent therein for communication with the water-supply tank, a one-way valve for admitting air into the air pressure chamber, one-way valve means for controlling respective flows of water from the supply tank into the hydraulic pressure chamber and of air from the air cylinder into the water supply tank, spring means in said intermediate area between the pressure chambers for urging the connected pistons in unison in the direction of the hydraulic pressure chamber and the discharge valve therein, conduit means for communicating between the hydraulic pressure chamber and the water in the supply tank whereby water may flow from said supply tank into the hydraulic pressure chamber responsive to pressure in the water supply tank for moving the connected pistons in the direction of the valve-controlled discharge vent of the air cylinder, a float member for floating on the surface of the water in the supply tank and being adapted for rising and falling with the water level in the tank, said float having an operative connection with the valve means which controls flow of water into the hydraulic pressure chamber, and means operative responsive to reciprocation of the hydraulic piston for opening the discharge valve in the hydraulic pressure chamber when the hydraulic piston is at the substantial maximum of its stroke toward the air cylinder, and closing said discharge valve when the hydraulic piston is at the substantial maximum of its stroke toward said discharge valve whereby water in the hydraulic pressure chamber may be discharged from said pressure chamber by the spring-actuated stroke of the hydraulic piston in one direction and air pumped from the air pressure chamber by the stroke of the hydraulic piston in the opposite direction.

16. A device of the character described having the elements of claim 15 and in which the means for opening and closing the discharge valve in the hydraulic chamber includes a snap action mechanism operative responsive to reciprocation of the hydraulic piston.

17. A device of the character described having the elements of claim 15 and in which the hydraulic cylinder and air cylinder are in relative coaxial alignment.

References Cited in the file of this patent

UNITED STATES PATENTS

| | | |
|---|---|---|
| 1,703,003 | Harteau | Feb. 19, 1929 |
| 2,318,782 | Jorgensen | May 11, 1943 |
| 2,447,173 | Gordon | Aug. 17, 1948 |